United States Patent [19]

McElroy

[11] 4,317,368
[45] Mar. 2, 1982

[54] ACOUSTIC EMISSION WARNING SYSTEM FOR A FIBERGLASS MEMBER

[76] Inventor: John W. McElroy, 520 Strathmore Rd., Havertown, Pa. 19083

[21] Appl. No.: 172,875

[22] Filed: Jul. 28, 1980

[51] Int. Cl.³ ............................................... G01H 1/00
[52] U.S. Cl. ..................................... 73/587; 340/683; 340/685
[58] Field of Search ................. 73/587, 658, 659, 801; 340/683, 685

[56] References Cited

U.S. PATENT DOCUMENTS

| | | | |
|---|---|---|---|
| 3,447,378 | 6/1969 | Dunegan et al. | 73/703 |
| 3,713,127 | 1/1973 | Keledy et al. | 73/587 |
| 3,774,443 | 11/1973 | Green et al. | 73/587 |
| 3,855,847 | 12/1974 | Leschek | 73/587 |
| 3,919,883 | 11/1975 | Nakamura | 73/587 |
| 3,985,024 | 10/1976 | Horak | 73/587 |
| 4,029,213 | 6/1977 | Thompson et al. | 340/685 |
| 4,033,179 | 7/1977 | Romrell | 73/587 |
| 4,088,907 | 5/1978 | Jones | 73/587 |

*Primary Examiner*—Stephen A. Kreitman
*Attorney, Agent, or Firm*—Seidel, Gonda, Goldhammer & Panitch

[57] ABSTRACT

An apparatus is provided for use as an onboard monitor and warning system attached to a fiberglas boom to detect potentially hazardous loads by detecting and counting acoustic emissions produced in the boom by the breakage of glass fibers. The monitor and warning system produce a warning signal when the number of acoustic emissions detected in a selected period of time indicates the existence of a potentially hazardous load. The apparatus includes a piezoelectric transducer which may be placed in contact with the surface of the fiberglas to produce electrical signals corresponding to pressure waves detected in the fiberglas. Apparatus is provided for distinguishing by the electrical signals those pressure waves which are acoustic emissions associated with the breakage of glass fibers from all other pressure waves. Further apparatus is provided for counting each electrical signal associated with fiber breakage, for selecting a period of time during which the electrical signals associated with fiber breakage will be accumulated, and for producing a warning signal when the number of electrical signals associated with fiber breakage during the selected time period indicates the existence of a potentially hazardous load.

7 Claims, 9 Drawing Figures

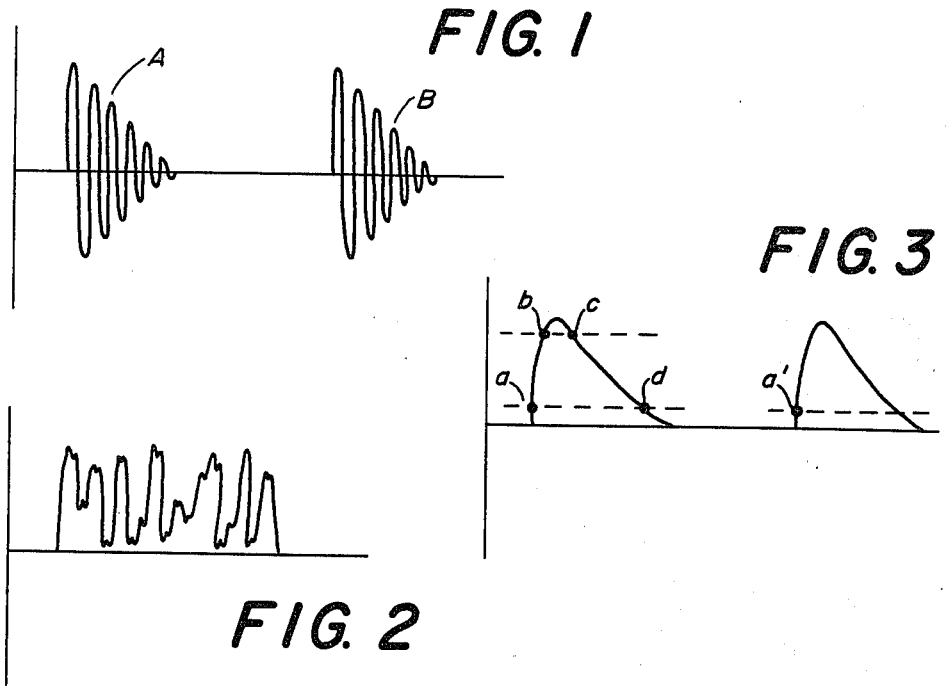
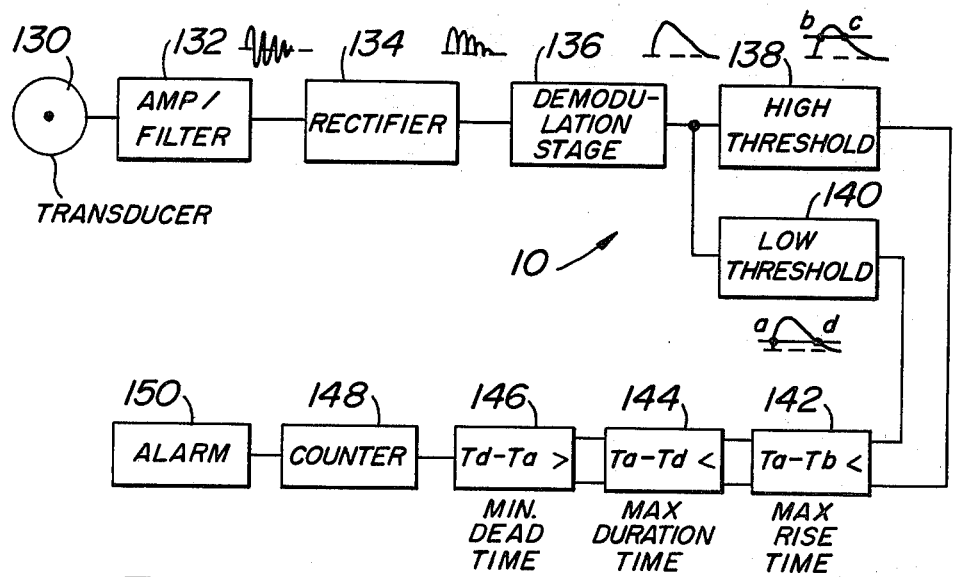

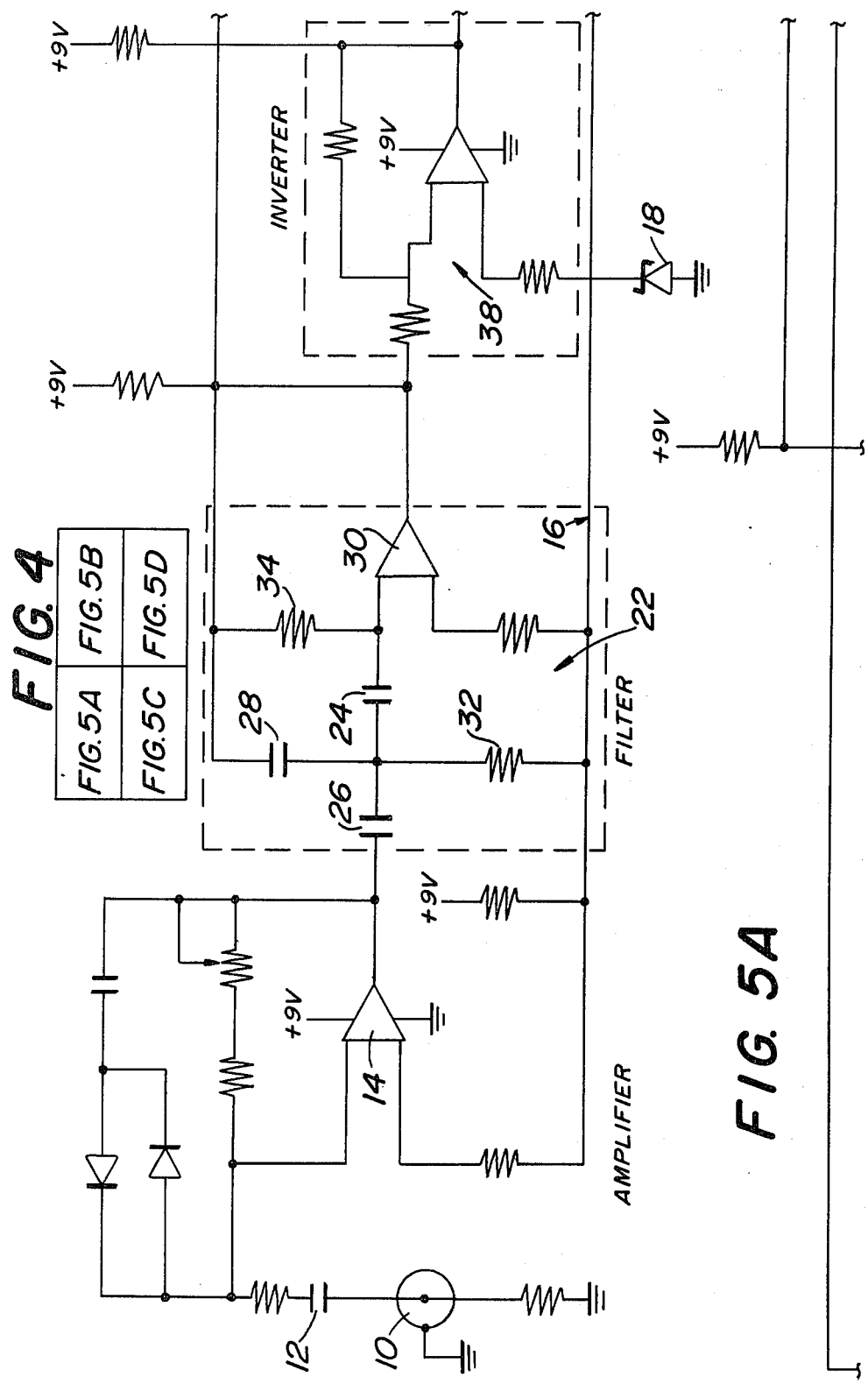

ACOUSTIC EMISSION WARNING SYSTEM FOR A FIBERGLASS MEMBER

BACKGROUND OF THE INVENTION

In recent years the use of acoustic emission techniques has become a significant aspect of non-destructive testing. Acoustic emission as defined herein, and as understood by the trade, refers to a transient elastic stress wave generated within a material as the material is deformed under stress. The emission is considered transient in that it will rapidly subside if the applied load remains constant. However, if the material is placed under a dynamically increasing load, the elastic wave will not be transient, but will be continually generated as the load is increased.

The physical events occuring within a material which give rise to acoustic emissions differ according to the properties of the specific material. For instance, the physical events occuring within a ferrous material under strain differ from the events occuring in fiberglas under strain. The present invention is related to the use of acoustic emission to detect damage loading of fiberglas booms or similar fiberglas members. Consequently, only the acoustic emission associated with events produced in fiberglas need be discussed.

There are three significant events which produce acoustic emissions in fiberglas. The first is called matrix crazing. Matrix crazing may be defined as the cracking of the polyester layers within the fiberglas composition. A second event which produces acoustic emission in fiberglas is called debonding. Debonding may be defined as the glass fibers breaking away from the polyester layers. The third, and by far most significant event causing acoustic emission in fiberglas is fiber breakage. Fiber breakage may be defined as the physical snapping of a strand of glass fiber in the tension mode.

Each of the above events release acoustic emission energies having discrete amplitudes and frequencies. For this reason, it is possible in the acoustic emission monitoring of fiberglas to discriminate and identify those acoustic emissions which correspond to fiber breakage. This invention is related in part to an acoustic monitor which discriminates and identifies fiber breakage.

A phenomena known as the Kaiser effect is associated with acoustic emissions. The Kaiser effect occurs in all materials, and is characterized by the immediate irreversible characteristic associated with acoustic emissions whereby acoustic emissions will not occur until the previous maximum stress level experienced by the material is exceeded. This phenomena is valid for materials generally, provided stresses are kept below the yield point.

However, a unique phenomena occurs in fiberglas. At a stress level approximately one-half of the residual strength of the fiberglas member, the material will no longer exhibit the Kaiser effect. Any subsequent loading which exceeds the one-half residual strength point will produce acoustic emissions, even though the loading does not exceed the previous maximum load. Even more importantly, the acoustic emission is no longer transient when the load exceeds the point corresponding to approximately one-half of the residual strength. Thus, even though the load remains constant, acoustic emissions will continue if the load is above the one-half residual strength point. This is an important feature in the non-destructive testing of fiberglas members, particularly booms.

Fiberglas members may be used in many applications. It is particularly important to guard against the failure of fiberglas booms when the boom is being used to support personnel at high levels above the ground. This is a common situation found in aerial trucks or "cherry pickers" which employ fiberglas booms.

Acoustic emission techniques have previously been used for periodic testing of the fiberglas booms of aerial trucks. This periodic testing is performed by placing a piezoelectric transducer in contact with the boom to detect acoustic emissions. The boom is then subjected to a proof load normally a multiple of the rated load which will not intentionally be exceeded in the field. A common practice in the industry is to use a proof load which is a nominal 1.5 to 3 times the rated load. The proof load is applied to the boom and held constant to allow the transient acoustic emission, if any, to die out. If the material is then acoustically silent, the test shows that the non-Kaiser point is greater than the proof load. Since the non-Kaiser point occurs at just over one-half of the residual remaining strength, and the proof load may be approximately 1.5 to 3 times greater than the rated load, there exists a safety factor of approximately between 3 to 1 and 6 to 1 for the boom.

Such periodic testing of fiberglas booms is normally carried out on a yearly, semi-annual or quarterly basis using the above described techniques. However, this periodic testing program is somewhat cumbersome and requires that the equipment be taken out of field use during the time of testing. Furthermore, special load equipment and personnel are required to conduct the test. Perhaps the greatest shortcoming of periodic testing is that there is no protection during the interval between tests, creating the possibility that a crew could be using a dangerous piece of equipment for several months before it is revealed by the next periodic test.

My research into catastrophic failures of actual field equipment has revealed another significant feature of fiberglas booms. A new boom, if stressed to failure by increasing the load over a relatively short period of time will result in the boom failing in the compression mode. However, in the field failures which I observed, the booms all failed in the tension mode. There is a dangerous difference between the failure modes. In compression failure, the boom bulges at the failure site and undergoes a delayed bending. This would result in the occupants of a basket at the end of the boom being dropped to the ground at a rate slower than a free fall. However, failure in the tension mode results in a sharp snap of the boom and a free fall of the basket. Personal injury is almost certain.

My research on the failed booms indicates that the tension mode failures were caused by significant fiber breakage in the boom. The fiber breakage was caused by loading the boom above the non-Kaiser point for a significant period of time. This loading above the non-Kaiser point causes fibers to snap in the tension mode. The occurence of significant fiber breakage caused by such loading may be referred to as a "damage load". The amount of fiber breakage depends upon how much the load exceeds the non-Kaiser point and on the amount of time spent above the non-Kaiser point. In other words, even a load which is just bearly above the non-Kaiser point may cause significant fiber breakage if it is applied for a long time.

As the residual strength is decreased by a damage load, the non-Kaiser point occurs at a lower load level. The effect is thus cumulative. A single severe damage load allows subsequent lesser loads to also produce damage.

In view of the above background, it is apparent that periodic testing may not be sufficient to insure personnel safety. Personnel safety can be better assured by having a continuous monitor employed on-board the aerial truck to warn of loading above the non-Kaiser point before severe damage to the residual strength occurs. It is an object of the present invention to provide such an on-board monitor.

An on-board monitor should be able to identify a damage load by detecting the existence of acoustic emission resulting from fiber breakage for more than a transient period. Since the monitor will be carried on board the truck, it must be able to discriminate acoustic emissions from mechanical and road noise. It must also be able to discriminate the acoustic emissions corresponding to fiber breakage from the acoustic emissions corresponding to the less significant debonding and matrix crazing events. The device should provide an immediate alarm to alert the operating crew when it has detected that a damaged load is occuring. These and further objects of the invention will become apparent as the device is described in more detail.

SUMMARY OF THE INVENTION

An apparatus is provided for use as an on-board monitor and warning system attached to a fiberglas member to detect potentially hazardous loads by detecting and counting acoustic emissions produced in the member by the breakage of glass fibers. The monitor and warning system produce a warning signal when the number of acoustic emissions detected in a selected period of time indicates the existence of a potentially hazardous load. The apparatus includes a piezoelectric transducer which may be placed in contact with the surface of the boom to produce electrical signals corresponding to pressure waves detected in the boom. Means are provided for distinguishing by the electrical signals those pressure waves which are acoustic emissions associated with the breakage of glass fibers from all other pressure waves. Further means are provided for counting each electrical signal associated with fiber breakage, and for producing a warning signal when the number of electrical signals associated with fiber breakage during a selected time period indicates the existence of a potentially hazardous load.

For the purpose of illustrating the invention, there is shown in the drawings a form which is presently preferred; it being understood, however, that this invention is not limited to the precise arrangements and instrumentalities shown.

BRIEF DESCRIPTION OF THE DRAWINGS

FIG. 1 shows a graphical representation of signals corresponding to acoustic waves produced in a fiberglas member by fiber breakage.

FIG. 2 shows a grahpical representation of signals corresponding to acoustic noise which may be produced in the member from a variety of sources.

FIG. 3 shows a representation of the rectified and demodulated envelopes of the waves shown in FIG. 1.

FIG. 4 is a legend showing the interrelationship of the composite drawing comprising FIGS. 5A, 5B, 5C and 5D.

FIGS. 5A, 5B, 5C and 5D form a composite drawing of a schematic diagram of a monitor and warning system according to the present invention.

FIG. 6 is a block diagram of a monitor and warning system according to the present invention.

DETAILED DESCRIPTION

Figure 5B:
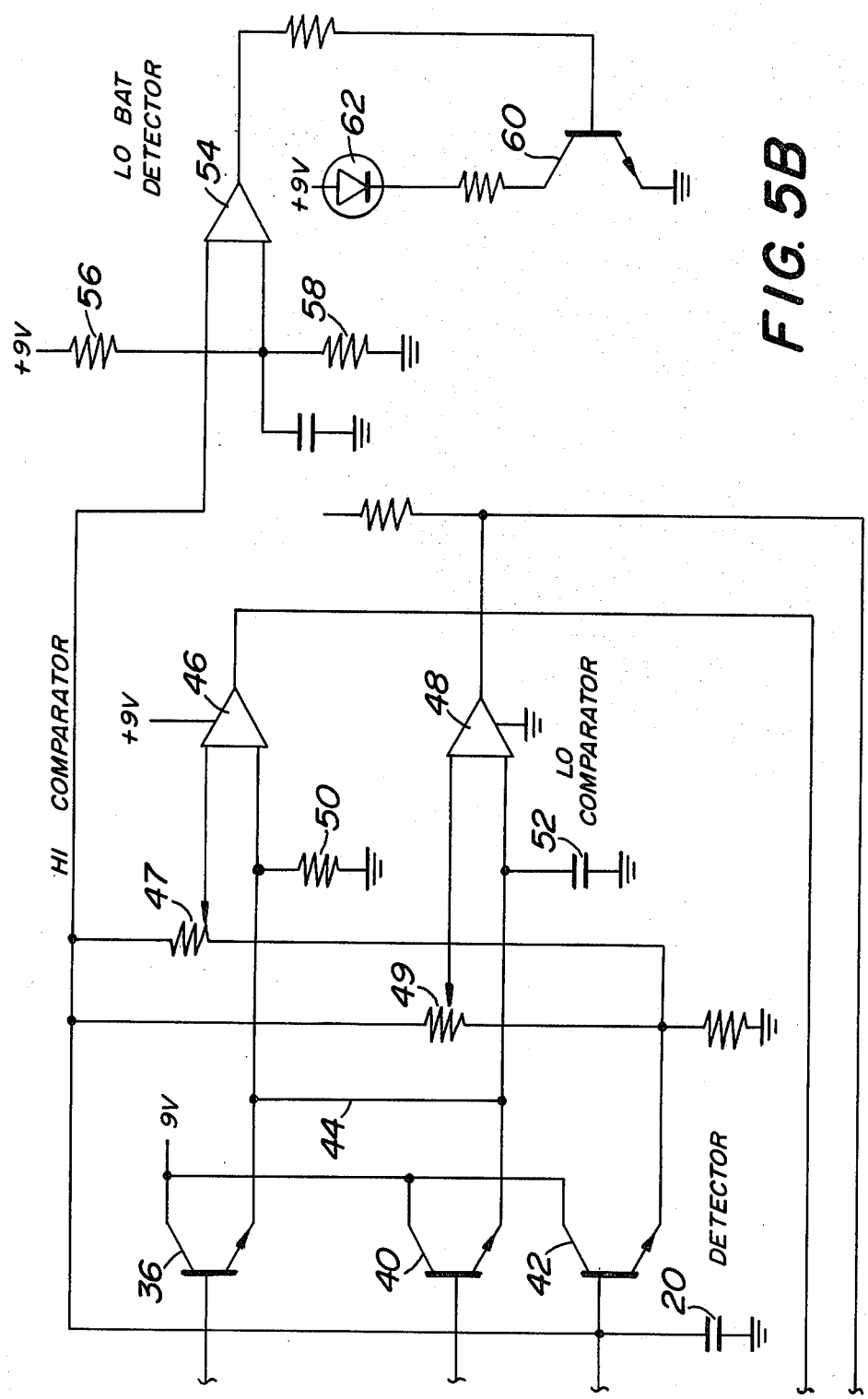

Referring now to FIG. 1, there is shown a representation of signals corresponding to acoustic wave produced in fiberglas by fiber breakage. Signal A corresponds to an acoustic wave produced by the breakage of a single fiber. Signal B corresponds to a signal produced by the breakage of a second fiber a short time subsequent. The signals are broad-band frequency, periodic waves with decaying amplitudes. Specifically, these signals are detectable amid environmental noise at a frequency band centered around approximately 7 KHz.

FIG. 2 shows a representation of acoustic environmental noise signals which may be produced in the boom from a variety of sources. Road jolts, vehicle vibrations, air gusts, rain, hail and the like may produce signals having frequencies within the band associated with acoustic emissions from fiber breakage. It is necessary to discriminate this noise from the acoustic emission signal. This may be done by using the demodulated envelope of the acoustic emission signals.

FIG. 3 illustrates the rectified and demodulated envelopes of the waves A and B of FIG. 1. Fiber breakage events can be discriminated from environmental noise by identifying signals displaying the characteristics of these wave envelopes. To identify the envelopes, two amplitude thresholds are established: a low threshold and a high threshold, as shown in FIG. 3. The low threshold is crossed by the wave envelope at two points, point "a" where the low threshold is crossed on the rise and point "d" where the low threshold is crossed during envelope decay. The high threshold is similarly crossed at two points, "b" and "c". The time intervals between these various points "a-b-c-d" may be processed through a logic network to identify this wave envelope.

Specifically, there are three identifying features of the wave envelope associated with fiber breakage acoustic emissions which will distinguish those emissions from noise and unwanted signals. The first is the rise time of the leading edge of the envelope, or the time from point "a" to "b". This rise time is normally between 50 and 100 microseconds for acoustic waves associated with fiber breakage. Thus, any signal having a rise time of greater than approximately 100 microseconds can be ignored, since it is not likely associated with fiber breakage.

The second identifying criteria is the duration of the envelope, or the time from point a to d. The duration is normally less than 1.5 milliseconds. The third identifying criteria may be termed the dead zone, or the time between "d" and "a'" of the next event. Specifically, only events wherein the time from "d" to "a'" is greater than 1.2 milliseconds are counted. While the dead zone is not technically a physical characteristic, since two fiber breakages can occur in close time proximity, for practical purposes this assures that the envelopes represent discrete events rather than simply noise as in FIG. 2.

A monitor of the type indicated may use these three criteria, i.e. maximum rise time, maximum duration time and minimum dead zone time to identify acoustic events associated with fiber breakage. The monitor can then be employed to count those events which are identified as being associated with fiber breakage. If enough acoustic events are accumulated in a short period of time to insure that the events are being caused by a damage load rather than by random fiber breakage, the monitor will trigger a visual and audio alarm to alert the crew that a damaged load is occuring.

A monitor of the type indicated is shown in the composite schematic comprising FIGS. 5A, 5B, 5C and 5D.

Referring to FIG. 5A, there is shown a piezoelectric transducer 10. Transducer 10 may be a piezoelectric accelerometer having a resonant frequency of approximately 30 KHz. Transducer 10 is attached to the fiberglas boom and responds to pressure variations therein, including those pressure variations associated with the acoustic waves produced by boom loading. Transducer 10 produces an electrical signal having an amplitude and frequency corresponding to the pressure variations it senses.

The electrical signal produced from transducer 10 is conditioned by capacitor 12, which filters out the d.c. component. Capacitor 12 is a relatively large capacitor, and may be of approximately 0.002 fareds in this circuit.

The conditioned signal is received by the inverting input of op-amp 14, which is a differential amplifier having its non-inverting input connected to a voltage stabilized bus 16. Bus 16 is supplied from a 9 Volt battery and is clamped to approximately 3 Volts by diode 18. A capacitor 20, (shown in FIG. 5B) is parallel with diode 18 thus charges to approximately 3 Volts.

Amplifier 14 amplifies the conditioned signal from sensor 10. The output of amplifier 14 corresponds in shape and frequency to the signal from sensor 10 but has a greater amplitude. This amplified signal is directed to active filter 22. Filter 22 is a band-pass filter for frequencies in the range of approximately 7-50 KHz. Filter 22 comprises identical capacitors 24, 26 and 28, op-amp 30, and resistors 32 and 34. Any of a variety of other filters for this band-width could be used.

Referring now to FIG. 5, the filtered output of active filter 22 is connected to the base of NPN transistor amplifier 36, and to inverter 38. Inverter 38 is a well known circuit using an op-amp differential amplifier to produce signal inversion. The output of inverter 38 is sent to the base of NPN transistor amplifier 40. Thus, the base input to transistor 40 is an inverted image of the base input to transistor 36. A third transistor 42 has its base connected to bus 16. The collectors of all three transistors 36, 40 and 42 are connected to the 9 Volt battery.

Transistors 36 and 40 provide amplification and full wave rectification frequency doubling for the acoustic signal. Transistors 36 and 40 are biased to pass only the positive half cycles of the signals received at their respective bases. The emitters of transistors 36 and 40 are coupled together by conductor 44. Since the signals received at the bases of transistors 36 and 40 are 180° out of phase with each other, it can be seen that transistors 36 and 40 operate in a push-pull manner through conductor 44 to provide full wave rectification. Frequency doubling is useful in providing a more accurate signal envelope after demodulation. However, half-wave rectification could also be used and would provide an acceptable envelope. Therefore, this invention is not limited to use of full-wave rectification and any later reference to rectification in the specification or the claims should be understood to encompass both full and half-wave rectification.

The rectified signal is then demodulated to examine its envelope by the effects of the parallel network comprising resistor 50 and capacitor 52. Resistor 50 and capacitor 52 should produce a time constant of approximately 4.7 milliseconds to produce a good replica of the envelope of the recitified acoustic wave. The envelope at this point corresponds to the envelope shown in FIG. 3.

The rectified and demodulated signal is received by the positive input terminal of comparator amplifier 46. The inverting input of comparator 46 receives a constant voltage tapped from potentiometer 47. Similarly, the rectified and demodulated signal 40 is also received by the positive input terminal of comparator amplifier 48, and the inverting input of comparator 48 receives a voltage tapped from potentiometer 49. The resistance setting on potentiometer 47 is higher than that on potentiometer 49. Thus, comparator 46 produces the high threshold detection and comparator 48 detects the low threshold, as pictured in FIG. 3.

Also on FIG. 5B, a detection circuit is provided to indicate when the power supply, herein a 9 Volt battery, needs to be replaced or recharged. A comparator 54 receives the approximately 3 Volt input from bus 16 at its non-inverting terminal. The inverting terminal is connected to a voltage divider circuit from the battery. The voltage divider comprises equal value resistors 56 and 58, thus providing one-half the remaining battery voltage at the inverting input of comparator 54. This is approximately 4.5 Volts for a fully charged battery. When the battery has discharged to approximately 6 Volts, comparator 54 produces an output signal to the base of transistor 60, causing transistor 60 to conduct, and thus turning on LED 62. LED 62 provides a visual indication that the battery is in need of replacement or recharging.

Figure 5C:
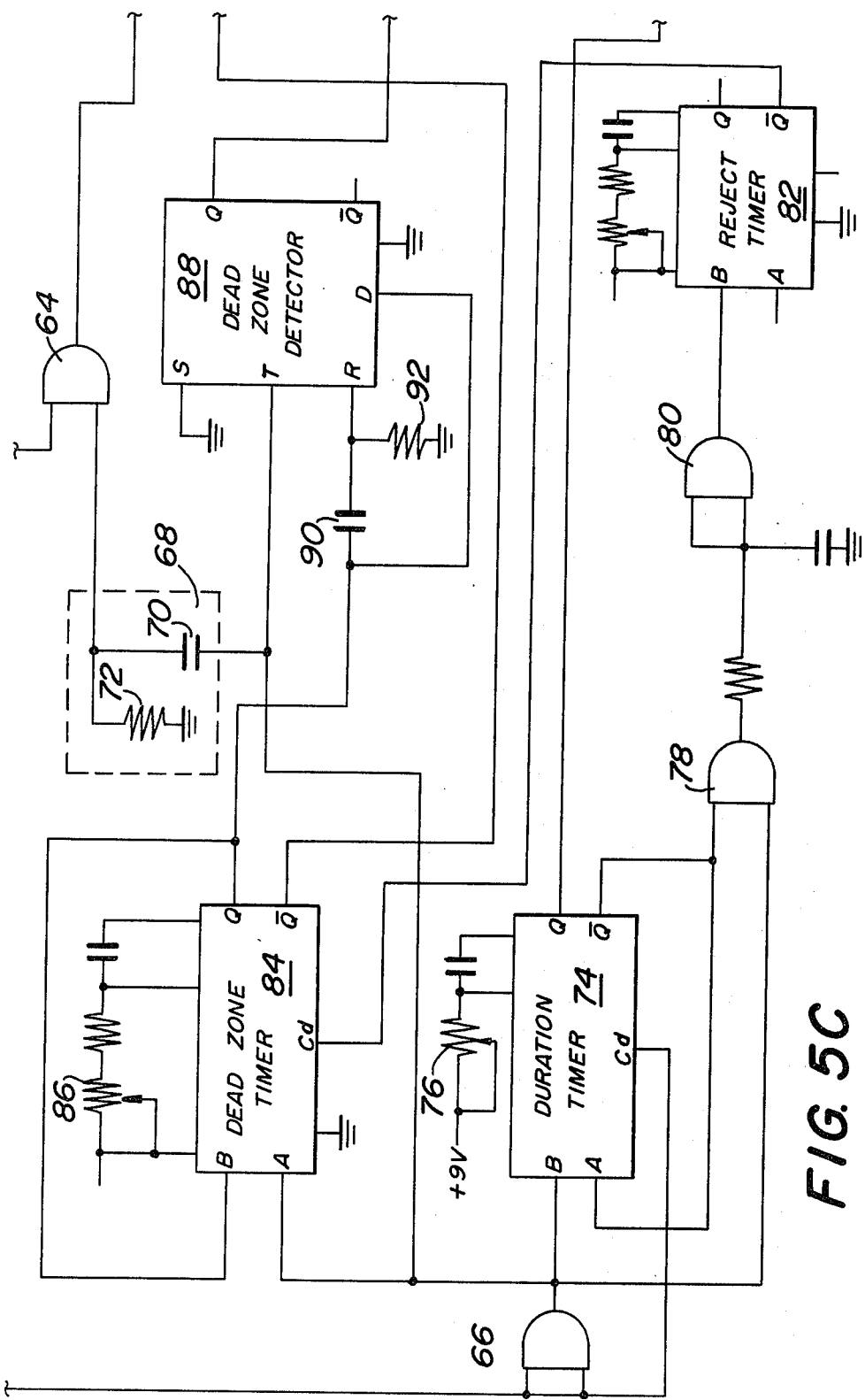
Figure 5D:
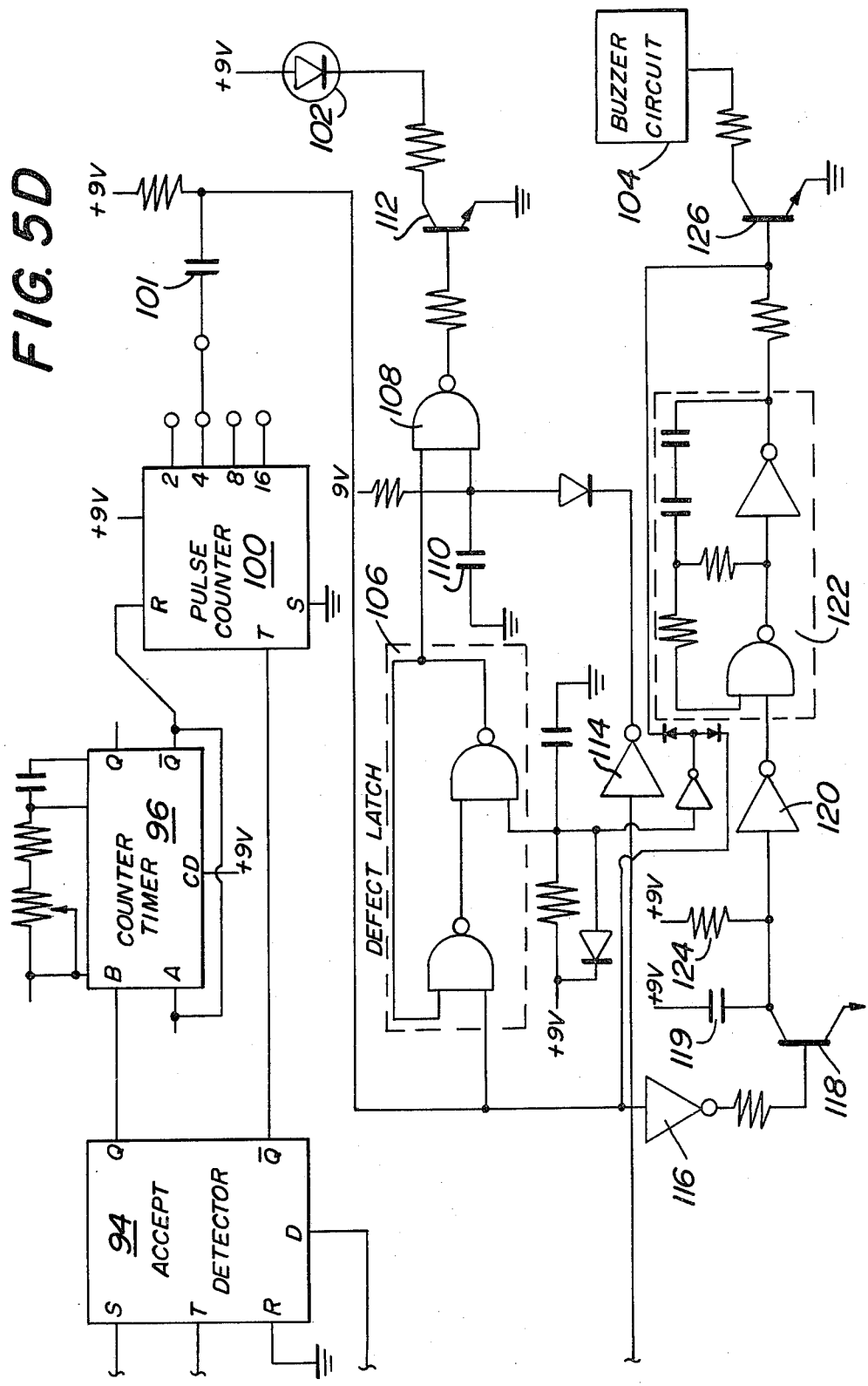

Referring now to FIG. 5C, the output from high comparator 46 is received as the one input to AND gate 64. The output of low comparator 46 is received at both inputs of AND gate 66, and is coupled through gate 66 to rise time detector circuit 68. Rise time detector circuit 68 comprises a capacitor 70 and a resistor 72. Capacitor 70 is preferably about 0.001 microfarads and resistor 72 is preferably about 100 K ohms. This produces a time constant of approximately 10 microseconds. The voltage across resistor 72 is provided to the second input of AND gate 64.

Rise time detector 68 thus identifies one of the characteristics of an acoustic event envelope associated with fiber breakage. As previously discussed, the rise time, or the time from "a" to "b" of FIG. 3 is on the order of 50 to 100 microseconds. Low comparator 48 will switch on first, identifying point "a". This signal will be received at rise time detector 68 and the entire voltage will initially be across resistor 72, and thus be input to AND gate 64. However, capacitor 70 will rapidly charge until the entire voltage 15 across capacitor 70 making a logical zero input to the lower input of AND gate 64. Capacitor 70 will charge in approximately 100 microseconds. Thus, only when the rise time from point "a" to point "b" of the envelope is less than approximately 100 microseconds will high comparator 46 be able to provide a logical one input to AND gate 64 within the time when a logical one is received by the other input of gate 64. A logical one on the output of AND gate 64 therefore signifies that the acoustic event detected by piezoelectric transducer 10 satisfies the requirement of fast rise time associated with fiber breakage.

The signal from low comparator 48 is also coupled through AND gate 66 to one input of duration timer 74. Timer 74 is a well known time delay integrated circuit, herein a Motorola MC14538. This type time delay is monostable device having dual inputs to start the timing cycle. One of the inputs inverts the received signal before entering the timer. These inputs are depicted in the drawings as A and B terminals. The B terminal is the normal input and the A terminal is the inverted input. Thus, if the signal is input through terminal A, the timer is started by the trailing edge of the pulse, whereas if the signal is input through terminal B, the timer is started at the leading edge of the pulse. Since the input to timer 74 is to the B terminal, timer 74 is triggered on by the leading edge of the pulse from low comparator 48, which corresponds to point "a" in FIG. 3.

Once the duration timer 74 is triggered on, it times out over a set period of time. The time may be adjusted through potentiometer 76. Timer 74 has a Q output terminal which produces a steady logical one signal when the timer is timing, and a steady logical zero after the timer has timed out. Timer 74 also has a $\overline{Q}$ output which produces a steady logical zero while the timer is timing and a steady logical one when the timer has timed out.

The $\overline{Q}$ output of timer 74 is input to one terminal of AND gate 78. The other input of AND gate 78 is the signal from low comparator 48 through AND gate 66. Thus, only if timer 74 times out before the end of the pulse received from low comparator 48 will there simultaneously be logical ones on both inputs to AND gate 78 and therefore a logical one output from AND gate 78. This corresponds to the situation wherein the time period from "a" to "d" in FIG. 3 exceeds the timing set on duration timer 74. As indicated previously, the duration of a acoustic event envelope corresponding to fiber breakage is normally less than 1.5 milliseconds. Duration timer 74 therefore may be set to time out at approximately 1.5 milliseconds to identify signals which exceed the maximum duration time.

If a signal exceeds the maximum duration time and is therefore not associated with fiber breakage, it should not be counted. Thus, the output of AND gate 78 is coupled through AND gate 80 to reject timer 82. Timer 82 is a device similar to timer 78. The output from AND gate 80 is sent to the B terminal of timer 82, so the leading edge of the signal from AND gate 80 starts reject timer 82. Thus, timer 82 is turned on as soon as duration timer 74 has timed out, provided there is still a signal from low comparator 48. Timer 82 produces a logical 0 on the $\overline{Q}$ output while timing out. Timer 82 is may be set to time out an approximately 11 milliseconds.

The $\overline{Q}$ output of timer 82 can then be considered to be a reject signal signifying that the acoustic event has failed the envelope duration test. The $\overline{Q}$ output of timer 82 is sent to the "clear" input Cd of timer 84. The function of timer 84, as will become apparent presently, is to test for the minimum dead zone criteria. In the characteristics of timers 74, 82 and 84 a logical 0 at the Cd terminal clears the timer. Thus, a signal from reject timer 84 corresponding to the acoustic event having failed the maximum duration time test can be considered a disable signal which prevents the acoustic event from being further considered.

The third test for an acoustic event is the minimum dead time test. The signal from low comparator 48 is coupled through AND gate 66 to the A input of dead zone timer 84. Timer 84 therefore begins timing at the trailing edge of the pulse, which corresponds to the occurence of point "d" of FIG. 3. Dead zone timer 84 may be adjusted by potentiometer 86 to time out at least 1.2 milliseconds. A logical 1 is produced on the Q output of dead zone timer 84 for at least 1.2 milliseconds following the trailing edge of the signal from low comparator 48. The $\overline{Q}$ output of timer 84 is normally a logical 1 and is switched down to a logical 0 for at least 1.2 milliseconds following the trailing edge of the signal from low comparator 48.

The Q output of timer 84 is sent to both the reset and data terminals of dead zone detector 88. Detector 88 is simply a D type flip-flop, herein a Motorola MC14013 integrated circuit. The Q output of timer 84 is not input directly to the reset terminal of detector 88, but rather is coupled through capacitor 90 and resistor 92. When a logical 1 first appears on the Q output of timer 84, the entire signal appears across resistor 92 and thus at the reset terminal of detector 88. However, as capacitor 88 charges the entire signal will appear across capacitor 88 and thus remove the reset signal from detector 88. The time constant of capacitor 90 and resistor 92 may be on the order of 0.1 microseconds. A logical one on the Q output of timer 84 will therefore initially reset detector 88, but the reset signal will be removed after 0.1 microseconds. The signal will continue to be applied to the data terminal D of detector 88 for the entire timing of timer 84.

The output of low comparator 48 is coupled through AND gate 66 to the clock terminal T of detector 88. Thus, if the subsequent acoustic event, indicated by the point "a'" of FIG. 3, arrives before the dead zone timer has timed out, detector 88 will output a logical 1 on its Q output. This corresponds to the acoustic event having failed the minimum dead zone test.

It can now be seen how acoustic events whose envelopes pass all three criteria are counted to determine if a damaged load condition exists, and how that count is used to trigger an audio and visual alarm to alert a crew that a damaged condition is occuring. If the first signal received passes the rise time test, it produces a logical 1 on the output of AND gate 64 which is connected to the "set" terminal of accept detector 94 (referring now to FIG. 5D). Accept detector 94 is a flip-flop identical to detector 88. The logical 1 at the set terminal of detector 94 produces a logical 1 output at the Q terminal which is in turn connected to the A input of a counter timer 96. Counter timer 96 is similar to timers 74, 82 and 84 and is set by potentiometer 98 to time out in approximately 100 milliseconds. Thus, it can be seen that the first acoustic event to pass the rise time test starts the counter timer 96.

The $\overline{Q}$ output of timer 96 is connected to the reset terminal of pulse counter 100. Counter 100 is a fourteen-bit binary ripple counter, herein a Motorola MC14040. Counter 100 will advance to the next state on each negative going transition received at the clock input T.

Normally, counter 100 is held at zero by the logical 1 output on the $\overline{Q}$ of timer 96. When counter 96 is started by the first acoustic event passing the rise time test, the reset pulse is removed and counter 100 is free to record individual acoustic events. Those individual acoustic events will occur at the end of each event envelope, or point "d" in FIG. 3. This will be input to the I terminal of counter 100 in the form of a negative going transition. This will occur in the following manner. If the acoustic envelope meets the duration timing test, no clear signal will be received on the Cd terminal of dead zone timer 84. The dead zone timer will then time out over its entire cycle, with the $\overline{Q}$ output of dead zone timer 84 being held at a logical 0 during the timing cycle and then rising to a logical 1 at the end of the timing cycle. The $\overline{Q}$ output of timer 84 is connected to the clock terminal T of detector 94. Detector 94 was set by the signal passing the rise time test, but the signal has not yet been counted by counter 100. Detector 94 will change state at the end of the timing on dead zone timer 84, since the $\overline{Q}$ output of timer 84 will then send a positive going transition to the T terminal of accepted detector 94. This means that the next event to pass the rise time test will again set detector 94 and send a negative going transition on the $\overline{Q}$ output of detector 94 to the clock terminal T of pulse counter 100, causing the counter to increment by one.

The above will occur unless the minimum dead zone test is failed. This would manifest itself by the second event envelope arriving at the clock terminal T of dead zone detector 88 before timer 84 has timed out. This would produce a logical 1 on the Q output of dead zone detector 88 and thus at the data terminal D of accept detector 94. Thus, when timer 84 timed out and produced a positive going transition on the T terminal of detector 94, there would simultaneously be a logical 1 on the data terminal D, so that the flip-flop would remain set. The next incoming acoustic event to pass the rise time test will appear at the S terminal of detector 94 but will not produce a negative going transition at Q output since the $\overline{Q}$ output is already at a logical 0. Thus there will be no negative going transition to be counted on the clock terminal T of pulse counter 100.

All the acoustic events which meet all three of the above described criteria, namely, maximum rise time, maximum duration, and minimum dead zone are counted by counter 100 as long as counter timer 96 has not timed out. To detect a damaged load condition in a fiberglas boom one can simply select a period of time on counter 96 and connect a warning signal to one of the stages of the counter. For example, the detector has been attached to the number 4 stage of counter 100, and timer 96 has been set for 100 milliseconds. Thus, if four acoustic events that are identified by the monitor as being produced by the breakage of glass fibers are counted in 100 milliseconds, the monitor will sound an alarm. This insures that the acoustic events are not random fiber breakage, but rather are being produced by a damaged load.

The particular warning system presently preferred for this monitor comprises a red LED 102 and a buzzer 104. LED 102 is wired to remain on even after the damage load has been reduced, unless the monitor is disconnected from its nine Volt power source. This is to provide a visual indication to maintenance personnel that a damage load has occured, without having to rely on the field crew reporting that the alarm sounded in the field. On the other hand, the buzzer turns off approximately 30 seconds after the load has been reduced. The buzzer would be a particular irritant if it continued to buzz until the monitor was reset.

Thus, the connection from the number 4 stage of counter 100 is applied to LED 102 through defect latch 106. Latch 106 normally supplies a logical 1 to one input of NAND gate 108. The other input to NAND gate 108 is held at 9 Volts by capacitor 110 which is charged from the 9 Volt battery. Thus NAND gate 108 normally produces a low to the base of transistor switch 112. Transistor 112 is thus held in a non-conducting state, and LED 102 is extinguished.

LED 102 is caused blink by the Q output of duration timer 74 being connected to the lower input terminal of NAND gate 108 through inverter 114. Thus, each incoming acoustic event causes LED 102 to blink until defect latch 106 has switched to its warning state.

When pulse counter 100 reaches four, a low occurs on the number four output stage and removes the 9 Volts normally input to defect latch 106. This causes latch 106 to change states and supply a logical zero to NAND gate 108. NAND gate 108 sends a high signal to the base of transistor 112 which causes the transistor 112 to switch on and conduct current through LED 102. Defect latch 106 will continue to hold this state even after pulse counter 100 is no longer on the number four stage. LED 102 will be continuously illuminated thereafter.

The buzzer circuit 104 is normally held off, since the nine volt signal from the power source is inverted by inverter 116 and thus applies a low voltage to the base of transistor 118, holding transistor 118 in a non-conducting state. When counter 100 reaches a count of four, a low voltage is produced on the counter pin and is made a transient pulse by capacitor 101. The low voltage pulse is inverted by inverter 116 and applies a high transient voltage to the base of transistor 118, causing transistor 118 to temporarily conduct and ground one side of capacitor 119. The buzzer will remain on while capacitor 119 is charging after transistor 118 becomes non-conductive. The buzzer may be set to alarm for a thirty second period. The buzzer will turn back on after the thirty seconds if the damage load continues. Buzzer circuit 104 may simply be a solenoid controlling a mechanical buzzer. Normally, a 9 Volt signal is input to inverter 120, causing a low to be sent to oscillator network 122. When transistor 118 conducts, the 9 Volts is shorted to ground through resistor 124 and transistor 118, causing inverter 120 to send a high voltage signal to oscillator 122. The output of oscillator 122 is sent to the base of transistor 126. Transistor 126 is thus switched on and off, causing buzzer circuit 104 to be repetitively opened and closed to produce the buzzer tone.

Referring now to FIG. 6, the operation of the monitor and warning system 10 can be understood by reference to the block diagram. Acoustic emission energy is picked up by transducer 130 and converted into an electrical signal. This signal is amplified and filtered by network 132. The signal from 132 is rectified by the rectifier stage 134 which eliminates negative half cycles. Rectifier stage 134 can be either a halfwave or fullwave rectifier. The rectified wave is then demodulated into a representative envelope by the modulation stage 136. The envelopes are then passed in parallel through a high threshold stage 138 and a low threshold stage 140. These threshold stages define the relevant time sequences for identifying those envelopes which represent acoustic emissions associated with fiberglas fiber breakage. The threshold stage outputs are then sent through three characteristic detection stages; the max rise time stage 142, the max duration stage 144, and the minimum dead time stage 146. If the envelope passes the measurement criteria of each of these stages, it is counted by counter 148. If counter 148 records a pre-set number of envelopes in a certain period of time, it turns on an alarm 150 signifying that a damaged load may be occurring.

The entire monitor and a battery power supply may be mounted in a small housing package and attached to the fiberglas dome. The on-board monitor may be used as follows. A proof load, usually just under three times the rated load, is applied to the boom to remove "virgin" acoustic emissions. Because of the Kaiser effect, no subsequent acoustic emissions will occur unless this load is exceeded. Also, since the proof load is less than one-half the residual strength, no damage loading is yet occurring and the Kaiser point is not being reduced.

If the monitor should come on in the field, it indicates that the previous maximum load is being exceeded. The crew thus has an immediate warning to reduce the load before significant damage occurs to the boom. The boom can then be scheduled for proof load testing to determine how much damage loading has occurred. That is, a load can be gradually applied to the boom until acoustic emissions begin or until the proof load is reached. If the emissions die out after a transient period, the non-Kaiser point has not been exceeded and the load on the boom indicates the maximum load to which the boom has been subjected in the past. However, if the acoustic emissions continue beyond a transient period, the Kaiser point has been exceeded and a new residual strength may be calculated.

As can be seen from the above, this monitoring system provides an instantaneous indication that acoustic emissions are occuring and that a damage load may be being produced. The safety of the crew can be provided for better than in periodic testing as was done in the past. There is an immediate indication that the load should be reduced, and that the boom should be returned for proof testing. Unlike periodic testing, a boom may be able to be operated for a substantial period of time before requiring a test. On the other hand, there is no danger from a boom of uncertain strength between tests.

The present invention may be embodied in other specific forms without departing from the spirit or essential attributes thereof and, accordingly, reference should be made to the appended claims, rather than to the foregoing specification, as indicating the scope of the invention. Moreover, it should be re-emphasized that the invention may be used with fiberglas members other than booms.

I claim:
1. An apparatus for use as an on-board monitor and warning system attached to a fiberglas member to detect potentially hazardous loads by detecting and counting acoustic emissions produced in the member by breakage of glass fibers and to produce a warning signal when the number of acoustic emissions detected in a selected period of time indicates the existence of a potentially hazardous load, comprising:
(a) a piezoelectric transducer to be placed in contact with a surface of the member to produce electrical signals corresponding to pressure waves detected in the member;
(b) means for distinguishing by the electrical signal those pressure waves which are acoustic emissions associated with the breakage of glass fibers from all other pressure waves;
(c) means for counting each electrical signal associated with fiber breakage;
(d) means for selecting a period of time during which the electrical signals associated with fiber breakage will be accumulated;
(e) means for producing a warning signal when the number of electrical signals associated with fiber breakage during the selected time period indicates the existence of a potentially hazardous load.

2. An apparatus as in claim 1 wherein the means for distinguishing by the electrical signals those pressure waves which are acoustic emissions associated with the breakage of glass fibers from all other pressure waves, comprises:
(a) means for rectifying the electrical signals to eliminate negative half-cycles;
(b) means for demodulating the rectified signals to produce representative wave envelopes of the rectified signals;
(c) means for comparing characteristics of the envelopes to known characteristics of envelopes of signals associated with fiber breakage;
(d) means for preventing signals whose envelope characteristics do not match the characteristics of signals associated with fiber breakage from being counted.

3. An apparatus as in claim 2 wherein the characteristics to be compared include the rise time of the leading edge of the envelope and the duration of the envelope.

4. An apparatus as in claim 3 wherein the known characteristics of the envelopes of signals associated with fiber breakage include a rise time of less than approximately 0.1 milliseconds and a duration of less than approximately 1.5 milliseconds, and the means for preventing signals whose envelopes do not match from being counted prevents all envelopes having a rise time greater than approximately 0.1 milliseconds or a duration greater than approximately from being counted.

5. An apparatus as in either claim 3 or 4 further comprising means for preventing signals from being counted when the time between the end of the envelope associated with the signal and the beginning of the envelope associated with the next subsequent signal is less than a selected time.

6. An apparatus as in claim 5 wherein the selected time between envelopes is approximately 1.2 milliseconds.

7. An apparatus for use as an on-board monitor and warning system attached to a fiberglas member to detect potentially hazardous loads by detecting and counting acoustic emissions produced in the beam by the breakage of glass fibers and to produce a warning signal when the number of acoustic emissions detected in a pre-selected period of time indicates the existence of a potentially hazardous load, comprising:
(a) a piezoelectric transducer to be placed in contact with a surface of the member to produce electrical signals corresponding to the pressure waves detected in the member;
(b) filter means to filter out electrical signals which are not in a frequency band associated with acoustic emissions caused by fiber breakage;
(c) rectifier means to eliminate the negative half-cycles of the electrical signals;
(d) demodulator means for producing representative wave envelopes of the rectified signals;
(e) means for producing a first signal when an envelope exceeds a first threshold;
(f) means for producing a second signal when an envelope exceeds a second threshold, the second threshold being of greater amplitude than the first threshold;

(g) means for determining the rise time of an envelopes from the time interval between the beginning of the first threshold signal and the beginning of the second threshold signal;

(h) means for determining the duration of an envelopes from the time interval between the beginning of the first threshold signal and the end of the first threshold signal;

(i) means for detecting the time between envelopes from the time interval between the end of a first threshold signal and the beginning of the next subsequent first threshold signal;

(j) means for comparing the rise time of an envelope to a maximum time associated with the rise time of an envelope of of an acoustic signal associated with fiber breakage;

(k) means for comparing the duration of an envelope to a maximum time associated with the duration of an envelope of an acoustic signal associated with fiber breakage;

(l) means for comparing the time between successive envelopes to a selective minimum time;

(m) counting means responsive to count only those envelopes which do not exceed the maximum rise time, do not exceed the maximum duration time and are separated by at least the selected minimum time between envelopes;

(n) means for producing a warning signal when the number of counts on the counting means during a selected time period exceeds a pre-selected number.

* * * * *